(12) United States Patent
Verbeke et al.

(10) Patent No.: US 11,814,539 B2
(45) Date of Patent: Nov. 14, 2023

(54) CROSS-LINKABLE THERMOPLASTIC POWDER FOR POWDER BASED ADDITIVE MANUFACTURING

(71) Applicant: Huntsman International LLC, The Woodlands, TX (US)

(72) Inventors: Hugo Verbeke, Wilsele (BE); Bram Vanroy, Haasrode (BE); David Briers, Brussels (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 234 days.

(21) Appl. No.: 17/414,104

(22) PCT Filed: Dec. 19, 2019

(86) PCT No.: PCT/EP2019/086196
§ 371 (c)(1),
(2) Date: Jun. 15, 2021

(87) PCT Pub. No.: WO2020/127655
PCT Pub. Date: Jun. 25, 2020

(65) Prior Publication Data
US 2022/0041889 A1 Feb. 10, 2022

(30) Foreign Application Priority Data
Dec. 21, 2018 (EP) .................... 18215041

(51) Int. Cl.
| | |
|---|---|
| *C09D 175/16* | (2006.01) |
| *B33Y 10/00* | (2015.01) |
| *B33Y 70/00* | (2020.01) |
| *B29C 64/153* | (2017.01) |
| *B29C 64/268* | (2017.01) |
| *C08G 18/67* | (2006.01) |
| *C09D 5/03* | (2006.01) |
| *B29K 33/04* | (2006.01) |
| *B29K 75/00* | (2006.01) |

(52) U.S. Cl.
CPC .......... *C09D 175/16* (2013.01); *B29C 64/153* (2017.08); *B29C 64/268* (2017.08); *B33Y 10/00* (2014.12); *B33Y 70/00* (2014.12); *C08G 18/672* (2013.01); *C09D 5/031* (2013.01); *B29K 2033/04* (2013.01); *B29K 2075/00* (2013.01)

(58) Field of Classification Search
CPC .... C09D 175/16; C09D 5/031; B29C 64/153; B29C 64/268; B33Y 10/00; B33Y 70/00; C08G 18/672; B29K 2033/04; B29K 2075/00; C08L 75/14
See application file for complete search history.

(56) References Cited

U.S. PATENT DOCUMENTS

| | | | |
|---|---|---|---|
| 3,974,303 A | 8/1976 | Iwase et al. | |
| 8,034,883 B2 | 10/2011 | Fujibayashi et al. | |
| 2010/0171241 A1* | 7/2010 | Huskamp | B33Y 10/00 264/497 |
| 2018/0056595 A1 | 3/2018 | Sterenthal et al. | |
| 2018/0171174 A1* | 6/2018 | Schaefer | C08G 18/792 |
| 2018/0345576 A1* | 12/2018 | Constantinou | B32B 5/245 |
| 2019/0352455 A1* | 11/2019 | Sriskandha | C08G 81/027 |

FOREIGN PATENT DOCUMENTS

| | | |
|---|---|---|
| CN | 106001565 | 10/2016 |
| WO | 2006/007457 | 1/2006 |
| WO | 2012004088 | 1/2012 |
| WO | 2015/197515 | 12/2015 |
| WO | 2018/229095 A1 | 12/2018 |

OTHER PUBLICATIONS

International Search Report in corresponding PCT Application PCT/EP2019/086196 completed Feb. 13, 2020 and dated Feb. 24, 2020.
Written Opinion in corresponding PCT Application PCT/EP2019/086196 completed Feb. 13, 2020 and dated Feb. 24, 2020.

* cited by examiner

*Primary Examiner* — Nahida Sultana
(74) *Attorney, Agent, or Firm* — HUNTSMAN INTERNATIONAL LLC; Lewis Craft

(57) ABSTRACT

A cross-linkable powder for use in a selective laser sintering (SLS) process for additive manufacturing is disclosed as well as a novel manufacturing process to form a 3D object using said cross-linkable powder. The manufacturing process makes it possible to create interlayer covalent bondings between deposited layers of cross-linkable powder such that 3D printed objects are achieved having improved mechanical strength, less object deformation and/or no warping.

24 Claims, No Drawings

CROSS-LINKABLE THERMOPLASTIC POWDER FOR POWDER BASED ADDITIVE MANUFACTURING

CROSS-REFERENCE TO RELATED APPLICATIONS

This application is the National Phase of International Application PCT/EP2019/086196 filed Dec. 19, 2019 which claims priority to European Patent Application 18215041.7 filed Dec. 21, 2018, both applications of which are incorporated herein by reference.

FIELD OF INVENTION

The present invention relates to cross-linkable thermoplastic polyurethane (TPU), more in particular cross-linkable TPU containing cross-linkable TPU compounds having UV and/or heat induced polymerizable moieties in the polymer chain backbone that can be used in a 3 dimensional (3D) printing device according to the invention, preferably in a 3D selective laser sintering (SLS) process and the conversion of the cross-linkable TPU into a thermoset elastomeric polyurethane thereby forming 3D printed objects.

The present invention further relates to a novel deposition method to create layers of polymeric material using powder based additive manufacturing, more in particular in a 3D selective laser sintering (SLS) device.

The present invention further relates to an improved and more robust 3D printing process for making 3D objects with improved strength, especially improved strength in the vertical direction (Z direction).

BACKGROUND OF THE INVENTION

Three-dimensional (3D) printing is an additive printing process used to make three-dimensional solid objects from a digital model. 3D printing is often used in rapid product prototyping, mold generation, and mold master generation. 3D printing techniques are considered additive processes because they involve the application of successive layers of material. This is unlike traditional machining processes, which often rely upon the removal of material to create the final object. Materials used in 3D printing often require curing or fusing, which for some materials may be accomplished using heat-assisted extrusion or sintering, and for other materials may be accomplished using UV laser and/or digital light projection technology.

Additive manufacturing processes utilize various materials and process techniques in order to build up objects in layers. In fused deposition modelling (FDM), for example, a thermoplastic polymer wire is liquefied and deposited in layers by means of a nozzle on a movable building platform. On solidification, a solid object is formed. Control of the nozzle and the building platform is done on the basis of a CAD drawing of the object. If the geometry of this object is complex, e.g. with geometric undercuts, support materials have to be additionally printed and removed again after the object has been finished.

There are additive manufacturing processes which utilize thermoplastic powders in order to build up objects in layers. Here, thin powder layers are applied by means of a coater and subsequently selectively melted by means of an energy source. The surrounding powder supports the component geometry in this case. Various objects can be arranged or produced closely packed in the powder bed. Owing to these advantages, powder-based additive manufacturing processes are among the most economical additive processes on the market. They are therefore predominantly employed by industrial users.

An example of a powder-based additive manufacturing process is selective laser sintering (SLS). In the laser sintering process, the energy is introduced by means of a laser beam in order to melt thermoplastic powders selectively.

Laser sintering in particular has been established in industry for many years and is utilized primarily for producing prototypes. However, although it has been announced for years by the media, companies and the research institutes active in this field, it has not become established on the market as process for the mass production of individually configured products. One of the significant reasons for this is the available materials and their properties. Objects whose mechanical properties differ fundamentally from the characteristics of the materials as are known in other polymer-processing processes, for example injection molding, are formed on the basis of the polymers which are used today in powder-based additive manufacturing processes. During processing by the additive manufacturing processes, the thermoplastic materials could be subject to object deformation, resulting in inferior print quality.

US2018056595 solves the problem of object deformation by providing additional support structures, creation of a shell around the object and stress calculations to counteract possible warping. However, this solution is complicated and gives limitations towards the final design.

CN106001565 solves the problem of object deformation by using a sensing device in the powder spreader to detect possible warping and give feedback to the operator to change the printer settings.

WO2006007457 solves the problem of object deformation by incorporating a heat sink placement in the build chamber to limit warping.

TPU's are well-known, in particular, for their very high tensile and tear strength, high flexibility at low temperatures, extremely good abrasion and scratch resistance. TPU's are also known for their superior dynamic properties, in particular, very high rebound figures, low compression set and hysteresis loss.

WO 2015197515 discloses use of thermoplastic polyurethane powders in powder-based additive manufacturing processes for producing thermoplastic objects. The problem addressed in WO'515 is to provide compositions which, after processing by means of powder-based additive manufacturing processes, give objects which have low residual porosity after solidification and good mechanical properties. This problem was solved by using powders made of a thermoplastic polyurethane composition which contain 0.02 to 0.5% by weight, based on the total amount of composition, of plasticizers. However, the problem of object deformation using a laser sintering process is not solved herewith.

For all reasons above indicated there is a need to improve the laser sintering process and/or the polymer powders used in the laser sintering process further such that a more robust process is developed leading to 3D printed objects having improved mechanical strength, less object deformation and/or no warping.

AIM AND SUMMARY OF THE INVENTION

It is a goal of the invention to develop new thermoplastic polymer powders which improve the selective laser sintering process used for 3D object printing such that at least object deformation is avoided and/or eliminated.

It is a further goal to develop an improved selective laser sintering process giving rise to an improved and cost-efficient method for making 3D printed objects and thereby creating more design freedom.

It is a further goal to develop an improved selective laser sintering process thereby using thermoplastic polymer powders and leading to 3D objects with improved mechanical properties.

To achieve above goals, the invention discloses a cross-linkable thermoplastic polyurethane (TPU) for use in a selective laser sintering (SLS) powder for additive manufacturing, said SLS powder having a number average particle diameter size below <250 μm and comprising at least 50 wt % of a cross-linkable TPU material calculated on the total weight of the powder and said cross-linkable TPU material having at least 50 wt % of cross-linkable TPU compounds having radically polymerizable unsaturation(s) incorporated in the polymer compounds which are UV and/or heat induced polymerizable moieties that give rise to chain growth polymerisation of the thermoplastic polymer compounds.

According to embodiments, the cross-linkable SLS powder comprises preferably >70 wt %, more preferably >80 wt % of cross-linkable TPU materials and the cross-linkable TPU material comprises cross-linkable TPU compounds having radically polymerizable unsaturation(s) incorporated in the TPU compounds which are UV and/or heat induced polymerizable moieties that give rise to chain growth polymerisation of the thermoplastic TPU compounds.

According to embodiments, the cross-linkable TPU material powder further comprises a UV and/or thermal initiator.

According to embodiments, the cross-linkable SLS powder has a Melt Volume Rate (MVR) at a given temperature above the melting temperature ($T_m$) of the polymer powder in accordance with ISO 1133 (at 5 minutes preheated time and load mass of 2.16 kg) from 5 to 15 cm$^3$/10 min and a change in MVR when increasing the temperature by 20° C. of less than 90 cm$^3$/10 min, preferably less than 70 cm$^3$/10 min, more preferably less than 50 cm$^3$/10 min.

According to embodiments, the cross-linkable TPU material is selected from cross-linkable thermoplastic polyurethane (TPU) material comprising at least 50 wt %, preferably >70 wt %, more preferably >80 wt % of cross-linkable TPU compounds having polymerizable unsaturated groups selected from the group of ethylenes, (poly)alkyl olefins, dienes, styrenes, halogenated olefins, vinyl ethers, vinyl esters, (meth)acrylic esters, (meth)acrylnitriles, N-vinyl carbazoles, N-vinyl pyrrolidones, aldehydes and ketones and combinations thereof.

According to embodiments, the polymerizable unsaturated groups are selected from (poly)alkylene glycol mono (meth)acrylates and/or (poly)alkylene glycol mono acrylates and combinations thereof.

According to embodiments, the cross-linkable TPU compounds have polymerizable unsaturated groups which are polymerizable through radical curing, anionic curing and/or cationic curing thereby using a UV and/or heat treatment.

According to embodiments, the cross-linkable TPU compounds have polymerizable unsaturated groups which are situated in the back bone and/or at the end of the cross-linkable TPU chain.

According to embodiments, the cross-linkable TPU material is selected from a cross-linkable TPU material comprising cross-linkable TPU compounds having a number average molecular weight in the range 5000 g/mol to 300000 g/mol, preferably between 5000 g/mol and 100000 g/mol.

According to embodiments, the cross-linkable TPU material is selected from a cross-linkable TPU material comprising cross-linkable TPU compounds having unsaturated groups in the back bone and/or at the end of the TPU chains and one or more ethylenically unsaturated compounds serving as co-cross linker wherein said ethylenically unsaturated compounds are selected from acrylates and/or methacrylates and combinations thereof.

According to embodiments, the cross-linkable TPU material is selected from cross-linkable TPU material having at least 50 wt % cross-linkable TPU compounds and wherein said cross-linkable TPU compounds are obtained by mixing and reacting at least following ingredients:
 a) one or more polyfunctional isocyanates,
 b) one or more polyfunctional polyols, preferably difunctional polyols having an average molecular weight in the range 500-20000 g/mol, and
 c) one or more mono or difunctional hydroxy and/or amine compounds comprising radically polymerizable unsaturation(s) serving as chain extender or chain stopper, and
 d) optionally one or more diol chain extenders having an average molecular weight below 500 g/mol
 e) optionally one or more ethylenically unsaturated compounds serving as co-cross linker
 f) optionally a UV and/or thermal initiator.

According to embodiments, the cross-linkable TPU material further comprises one or more ethylenically unsaturated compounds serving as co-cross linker having a number average molecular weight of 50-4000 g/mol, preferably 70-2000 g/mol, more preferably 70-1500, most preferably 70-1000 g/mol.

According to embodiments, the cross-linkable TPU material comprises cross-linkable TPU compounds and one or more ethylenically unsaturated compounds and the amount of ethylenically unsaturated compounds is <50 wt %, preferably in the range 1-30 wt %, more preferably in the range 1-20 wt % calculated on the total weight of the TPU material.

According to embodiments, the cross-linkable TPU compounds are selected from cross-linkable TPU compounds having a crystallization temperature (Tc) measured by DSC in accordance with ISO 11357 (taking only the first heating run into account and using a cooling rate of 10 K/min) of at least 40° C., preferably greater than 70° C., more preferably greater than 90° C.

According to embodiments, the cross-linkable TPU compounds are selected from cross-linkable TPU compounds wherein the difference between the $T_m$ and $T_c$ of the cross-linkable thermoplastic polyurethanes (TPU) measured by DSC is between 10° C. and 75° C.

According to embodiments, the cross-linkable TPU compounds are selected from cross-linkable TPU compounds having a $T_m$ measured by DSC in accordance with ISO 11357 (taking only the first heating run into account and using a heating rate of 10 K/min) of at least 50° C., preferably greater than 70° C., more preferably greater than 120° C.

According to embodiments, the cross-linkable SLS powder according to the invention has a number average particle diameter size below <250 μm, preferably <150 μm, more preferably <75 μm and a sphericity factor of between 0.6 and 1, preferably between 0.85 and 1.

According to embodiments, the cross-linkable SLS powder according to the invention has a $D_{50}$ particle diameter <250 μm, preferably <150 μm, more preferably <75 μm, a $D_{97}$ particle diameter <500 μm, preferably <300 μm, more preferably <220 µm, a $D_{10}$ particle diameter ≥1 µm, preferably ≥10 µm, more preferably ≥20 µm and a sphericity factor of between 0.6 and 1, preferably between 0.85 and 1.

Further, the invention discloses a manufacturing process selected from selective laser sintering (SLS) to form a 3D object using the cross-linkable Selective Laser Sintering (SLS) powder according to the invention comprising the cross-linkable thermoplastic polyurethane (TPU) material according to the invention. This manufacturing process makes it possible to create interlayer covalent bondings between deposited layers of cross-linkable SLS powder. Said process having at least the following steps:

a) Providing onto a surface a first layer of the cross-linkable SLS powder of the invention;

b) Defining a predefined pattern with an infrared (IR) laser sintering into said first layer by inducing a temperature above the $T_m$ such that the particles of the cross-linkable SLS powder are sintered to form a predefined pattern of the 3D object (sintering step), and then or simultaneously c) Apply a cross-linking treatment selected from electron beam treatment, UV treatment and/or heat treatment in order to convert at least part of the sintered cross-linkable thermoplastic polyurethane (TPU) material in the SLS powder into thermoset cross-linked polyurethane (TPU) material thereby remaining at least partly polymerizable moieties on top of the deposited SLS powder layer (curing step), d) Providing a second layer of cross-linkable SLS powder on top of the first layer, e) Applying a second sintering step (b) and curing step (c) to further define the predefined 3D object, f) repeat foregoing steps until the 3D object is finalized, and then optionally g) Apply a final cross-linking treatment selected from UV curing and/or heat treatment in order to convert at least some of the remaining cross-linkable thermoplastic polyurethane (TPU) material(s) into thermoset polyurethane (TPU) material(s).

According to embodiments, the step (b) of defining a predefined pattern with laser sintering is performed at a temperature above the $T_m+2°$ C., preferably above $T_m+10°$ C., more preferably above $T_m+20°$ C.

According to embodiments, the step (c) of applying a cross-linking treatment is achieved by tuning the intensity of the curing agent, preferably by tuning the strength of a UV radiation laser and/or by providing a cure regulating environment.

According to embodiments, the cure regulating environment is created by providing an oxygen rich environment on top of the deposited polymer powder layer, preferably an environment wherein the amount of oxygen is above 30 ppm, preferably above 50 ppm, most preferably above 200 ppm calculated on the total amount of gasses in the environment above the deposited SLS powder layer.

According to embodiments, the 3D printed object is made using a cross-linkable SLS powder which comprises different cross-linkable TPU materials having different mechanical properties and/or thermal stability properties and/or colours before and/or after performing the curing step (c).

According to embodiments, the 3D printed object is made using at least a first and a second cross-linkable SLS powder wherein the first cross-linkable SLS powder has different cross-linkable TPU materials having different mechanical properties and/or thermal stability properties and/or colours compared to the second cross-linkable SLS powder before and/or after performing the curing step (c).

Further to the invention, a three dimensional (3D) printed object using the process according to the invention is disclosed.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying examples which illustrate, by way of example, the principles of the invention.

Definitions and Terms

In the context of the present invention the following terms have the following meaning:

1) The isocyanate index or NCO index or index is the ratio of NCO-groups over isocyanate-reactive hydrogen atoms present in a formulation, given as a percentage:

$$\frac{[NCO] \times 100}{[active\ hydrogen]}\ (\%)$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is not only considered from the point of view of the actual polymerisation process preparing the material involving the isocyanate ingredients and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are also taken into account in the calculation of the isocyanate index.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

4) The term "hard block content" of a material refers to 100 times the ratio of the amount (in pbw) of polyisocyanate+isocyanate-reactive compounds having a molecular weight of 500 or less (wherein polyols having a molecular weight of more than 500 incorporated in the polyisocyanates are not taken into account) over the amount (in pbw) of all polyisocyanate+all isocyanate-reactive compounds used in making the material. Typically the compounds having a molecular weight of 500 or less are referring to the chain extender, chain stopper and isocyanate compounds used.

5) The word "average" refers to number average unless indicated otherwise.

6) "Liquid" means having a viscosity of less than 10 Pa·s measured according to ASTM D445-11a.

7) The term "room temperature" refers to temperatures of about 20° C., this means referring to temperatures in the range 18° C. to 25° C. Such temperatures will include, 18° C., 19° C., 20° C., 21° C., 22° C., 23° C., 24° C., and 25° C.

8) The term "elastomer" or "material having elastomeric properties" refers to a material that will resume its original shape after being deformed and they can be stretched many times and will then elastically recover to their original shape when released.

9) The term "polyurethane", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.

10) The term "thermoplastic" as used herein refers in its broad sense to designate a material that is reprocessable at an elevated temperature, whereas "thermoset" designates a material that exhibits high temperature stability without such reprocessability at elevated temperatures.

11) The term "urea group free" is used herein to design a polymer backbone with less than 0.1% free urea groups available for reaction with other molecules. Similarly, the terms isocyanurate free and oxazolinyl free are used to design a polymer backbone with less than 0.1% free isocyanurate or oxazolinyl groups available for reaction with other molecules. As used herein the term "pendant group free" is used to design a polymer backbone having less than 0.01% of pendant groups containing polymerizable double bonds.

12) Selective laser sintering (SLS) is an additive manufacturing (AM) technique that uses a laser as the power source to sinter powdered (polymeric) material aiming the laser automatically at points in space defined by a 3D model, and fusing the material together to create a solid structure. The laser melts at least the outer surface of the particles thereby fusing the (polymeric) cores to each other and to the previous layer and thereby transferring the powdered (polymeric) material into a mass that has a desired three-dimensional shape. The SLS process according to the inventions aims to create fusion and creation of covalent bondings between the powdered (polymeric) material thereby additionally using a radical curing source.

13) Cross-linkable SLS powder according to the invention refers to a TPU based powder having an average particle size below <250 μm and comprising at least 50 wt %, preferably >70 wt %, more preferably >80 wt % of a thermoplastic polyurethane (TPU) material calculated on the total weight of the powder.

14) Cross-linkable thermoplastic polyurethane polymer (TPU) compound(s) according to the invention refers to polymer chains made of thermoplastic polyurethane and comprising polymerizable moieties in the chain of the polymer compounds (such as e.g. acrylic groups) which give rise to chain growth polymerisation during curing (after applying a UV and/or heat treatment).

15) Cross-linkable thermoplastic polyurethane polymer (TPU) material according to the invention refers to a TPU based material comprising at least 50 wt %, preferably >70 wt %, more preferably >80 wt % of cross-linkable TPU compounds based on the total weight of the cross-linkable TPU material. Examples of said materials are cross-linkable TPU pellets made by extruding cross-linkable TPU compounds together with additives, co-cross linker compounds and/or additional polymer compounds.

16) Melt Volume Rate (MVR) is the rate of extrusion of a molten resin through a capillary of specified length and diameter under prescribed conditions of temperature and pressure, the rate being determined as the volume extruded over a specified time. MVR is expressed in units of cubic centimetres per 10 min ($cm^3$/10 min).

Melting behavior is determined via the change in the MVR (melt volume rate) in accordance with ISO 1133 at 5 minutes preheated time and load mass of 2.16 kg as a function of the temperature. A melting behaviour is considered to be "flat" when the MVR at an initial temperature T has an initial value of from 5 to 15 $cm^3$/10 min and this value does not increase by more than 90 $cm^3$/10 min when the temperature is increased by 20° C. to T+20° C.

17) Crystallization temperature ($T_a$) is determined using the onset temperature of the exothermic peak in the DSC curve and is measured using DSC according to ISO 11357 (taking into account only the first heating run) using a heating rate of 10 K/min and is expressed in ° C.

18) Melt Temperature or Melting Point ($T_m$) is referring to the temperature at which the powder melts and is measured using Differential Scanning calorimetry (DSC). Using DSC the temperature increases and the sample eventually reaches its melting temperature ($T_m$). The melting process results in an endothermic peak in the DSC curve which corresponds to $T_m$. The melting temperature is determined by the onset temperature of the endothermic peak in the DSC curve measured according to ISO 11357 (taking into account only the first heating run) using a heating rate of 10 K/min and is expressed in ° C.

19) $D_{10}$ particle diameter refers to a particle size (diameter) distribution (also referred to as Mass-Median-Diameter, MMD) at which 10% of a sample's mass is comprised of smaller particles. The particle size is measured according to ISO 13320.

20) $D_{50}$ particle diameter refers to a particle size (diameter) distribution (also referred to as Mass-Median-Diameter, MMD) at which 50% of a sample's mass is comprised of smaller particles. The particle size is measured according to ISO 13320.

21) $D_{97}$ particle diameter refers to a particle size (diameter) distribution at which 97% of a sample's mass is comprised of smaller particles. The particle size is measured according to ISO 13320.

22) "Particle size" refers herein to number average particle diameter measured according to ISO 13320.

DETAILED DESCRIPTION

It is a goal of the invention to improve powder based additive manufacturing, more in particular the selective laser sintering process used for 3D object printing such that at least object deformation is avoided and/or eliminated. The goal is achieved by using polymer powders comprising cross-linkable thermoplastic (TP) polymer compounds, preferably thermoplastic polyurethane (TPU) polymer compounds having polymerizable moieties in its polymer chain thereby improving interlayer adhesion during the SLS layer printing by formation of covalent bonds between the layers. The interlayer adhesion will especially improve the Z-direction strength and preventing object deformation (warping) during printing caused by poor interlayer adhesion.

It is a further goal to develop an improved selective laser sintering process giving rise to an improved and cost-efficient method for making 3D printed objects and thereby creating more design freedom. The goal is achieved by using the cross-linkable SLS powder according to the invention whereby the thermoplastic polyurethane is converted into a thermoset polyurethane material after applying the improved powder based additive manufacturing process of the present invention, more in particular the improved selective laser sintering process of the present invention.

It is a further goal to develop an improved selective laser sintering process thereby using thermoplastic polyurethane materials to create SLS powders and leading to 3D objects with improved mechanical properties. The goal is achieved by using the cross-linkable SLS powder according to the invention whereby interlayer covalent bondings are formed and a stronger material is achieved. Preferably the interlayer covalent bondings are created by creating an incomplete curing at the top of a freshly deposited layer e.g. by applying an atmosphere that contains scavengers for the chain growth polymerization. Due the incomplete cured top surface the consecutive deposited layer will be able to form covalent bonds with the previous layer to enhance the vertical (Z) directional strength.

Additionally, the use of the cross-linkable SLS powder according to the invention involves the incorporation of polymerizable moieties in the chain of the polymer compounds (such as e.g. acrylic groups) which give rise to chain growth polymerisation during curing (after applying a UV and/or heat treatment). This could result in a cross-linkable SLS powder exhibiting a lower melting temperature compared to state of the art SLS powders. The use of the cross-linkable SLS powder according to the invention in an additive manufacturing process may hence result in a lower energy consumption and a faster overall production process (heating and cooling cycle of the print bed/tank can be reduced).

Therefore, the present invention is disclosing cross-linkable TPU material comprising cross-linkable TPU compounds suitable for use in additive manufacturing process such as a selective laser sintering (SLS) process. The cross-linkable SLS powders are selected from SLS powders comprising cross-linkable TPU materials and wherein:

the cross-linkable TPU materials comprise at least 50 wt % cross-linkable TPU compounds with polymerizable moieties in the chain of the polymer compound which are capable of forming cross-links by applying a UV and/or heat treatment, and the powder has an average particle diameter sizes below <250 µm, preferably below 100 µm, and the powder further comprises optionally a UV and/or thermal initiator the powder further comprises optionally one or more ethylenically unsaturated compounds serving as reactive diluent (also called co-cross-linker) to create additional cross-linking during curing of the cross-linkable TPU, the powder further comprises optionally further additives.

According to embodiments, the cross-linkable SLS powders have a Melt Volume Rate (MVR) above the melting temperature Tm of the polymer powder in accordance with ISO 1133, using a load mass of 2.16 kg, of from 5 to 15 cm$^3$/10 min and a change in MVR when increasing the temperature by 20° C. of less than 90 cm$^3$/10 min, preferably less than 70 cm$^3$/10 min, more preferably less than 50 cm$^3$/10 min.

According to embodiments, the SLS method according to the invention is able to convert the cross-linkable TPU compounds in the cross-linkable SLS powder into thermoset PU compounds thereby achieving a 3D object with predefined shape and improved strength compared to state of the art SLS methods.

The present invention therefore provides a novel selective laser sintering process which makes it possible to create interlayer covalent bondings between the deposited layers, said process having at least the following steps:

a) Providing onto a surface a first layer of cross-linkable SLS powder according to the invention;

b) Defining a predefined pattern with an infrared (IR) laser sintering into said first layer at a temperature above the $T_m$ such that the particles of the cross-linkable SLS powder are sintered to form a predefined pattern of the 3D object (sintering step), and then or simultaneously c) Apply a cross-linking treatment selected from electron beam treatment, UV treatment and/or heat treatment in order to convert at least part of the sintered cross-linkable SLS powder into thermoset cross-linked polymer powder thereby remaining polymerizable moieties on top of the deposited SLS powder layer (curing step), d) Providing a second layer of cross-linkable SLS powder on top of the first layer, e) Applying a second sintering step (b) and curing step (c) to further define the predefined 3D object, f) repeat foregoing steps until the 3D object is finalized, and then optionally g) Apply a final cross-linking treatment selected from UV curing and/or heat treatment in order to convert at least some of the remaining cross-linkable TPU compounds into thermoset polymeric compounds.

According to embodiments, step (c) of applying a cross-linking treatment selected from UV curing and/or heat treatment in order to convert at least part of the sintered SLS powder into thermoset SLS powder thereby remaining polymerizable moieties on top of the deposited SLS powder layer is achieved by tuning the intensity of the curing agent e.g. by tuning the strength of a UV radiation laser.

According to embodiments, the step of applying a cross-linking treatment selected from UV curing and/or heat treatment in order to convert at least part of the sintered SLS powder into a thermoset (polyurethane) polymer thereby remaining polymerizable moieties (at least) on top of the deposited layer is achieved by continuously maintaining a zone of radical scavenger, e.g. by creating an oxygen rich environment on top of the deposited polymer layer.

According to embodiments, the 3D printed object may comprise several (different) thermoset polymer (TPU) materials with different mechanical properties and/or thermo stability properties and/or colours.

According to embodiments, the at least one cross-linkable TPU material according to the invention is selected from a cross-linkable thermoplastic polyurethane polymer (TPU) material containing at least one cross-linkable TPU compound having polymerizable unsaturated groups selected from the group of ethylenes, (poly)alkyl olefins, dienes, styrenes, halogenated olefins, vinyl ethers, vinyl esters, (meth)acrylic esters, (meth)acrylnitriles, N-vinyl carbazoles, N-vinyl pyrrolidones, aldehydes and ketones. Preferred examples are (poly)alkylene glycol mono (meth)acrylates and/or (poly)alkylene glycol mono acrylates and combinations thereof.

According to embodiments, the at least one cross-linkable TPU compounds according to the invention have polymerizable unsaturated groups which are polymerizable through radical curing, anionic curing and/or cationic curing thereby using a UV and/or heat treatment.

According to embodiments, the at least one cross-linkable TPU compounds according to the invention have polymerizable unsaturated groups which are situated in the back bone and/or at the end of the cross-linkable TPU compound (polymer chain).

According to embodiments, the at least one cross-linkable TPU compounds according to the invention have a number average molecular weight in the range between 5000 g/mol and 300000 g/mol, preferably between 5000 g/mol and 100000 g/mol.

According to preferred embodiments, the at least one cross-linkable TPU compounds according to the invention have a number average molecular weight in the range 5000 g/mol to 12000 g/mol, more preferably between 5000 g/mol and 10000 g/mol, most preferably between 5000 g/mol and 8000 g/mol.

According to preferred embodiments, the at least one cross-linkable TPU compounds according to the invention have a number average molecular weight in the range 20000 g/mol to 500000 g/mol, more preferably between 35000 g/mol and 250000 g/mol, most preferably between 80000 g/mol and 100000 g/mol. Higher molecular weights are usually preferred when cross-linkable TPU compounds having high hard block contents are required.

According to embodiments, the at least one cross-linkable TPU material according to the invention may be selected from a cross-linkable TPU material (e.g. in the form of a TPU comprising pellet) comprising at least 50 wt %, preferably >70 wt %, more preferably >80 wt % of cross-linkable TPU compounds based on the total weight of the cross-linkable TPU material. Examples of said materials are cross-linkable TPU pellets made by extruding TPU compounds together with additives, co-cross linker compounds and/or additional polymer compounds.

According to embodiments, the cross-linkable TPU compounds have polymerizable moieties having unsaturated groups in the back bone and/or at the end of the TPU chains.

According to embodiments, the at least one cross-linkable TPU material according to the invention may be selected from a cross-linkable TPU material (e.g. in the form of a TPU comprising pellet) comprising beside cross-linkable TPU compounds one or more ethylenically unsaturated compounds serving as co-cross linker wherein said ethylenically unsaturated compounds are selected from acrylates and/or methacrylates and combinations thereof with a functionality >1.

According to embodiments, the cross-linkable TPU material comprising at least one cross-linkable TPU compound may be obtained according to the methods described in WO2012/004088 which is incorporated herein by reference.

According to embodiments, the cross-linkable TPU material suitable for use in the SLS process according to the invention may be obtained by mixing and reacting at least following ingredients:
- one or more polyfunctional isocyanates,
- one or more polyfunctional polyols, preferably difunctional polyols having an average molecular weight in the range 500-20000 g/mol, and
- one or more monols and/or monoamines comprising radically polymerizable unsaturation(s), and
- optionally one or more diol chain extenders having an average molecular weight below 500 g/mol
- optionally one or more ethylenically unsaturated compounds serving as reactive diluent (also called co-cross-linker) to create cross linking of the final thermoplastic polyurethane
- optionally a UV and/or thermal initiator.

According to embodiments, the at least one cross-linkable TPU compound has a Tc (crystallization temperature measured by DSC) of at least 50° C., or even greater than 70° C. or greater than 90° C., and in some embodiments less than 200, 180, or even less than 160° C.

According to embodiments, the difference between the Tm and Tc of the cross-linkable TPU compounds measured by DSC are between 10 and 75° C., or a difference of at least 10, 20, 30, 40, or 50° C.

According to embodiments, the cross-linkable TPU compounds used in the cross-linkable TPU material of the invention have a $T_m$ (melting temperature as measured by DSC) of at least 60° C., preferably greater than Tc+10° C., preferably in the range of minimum Tc+10° C. and maximum Tc+75° C.

According to embodiments, the cross-linkable TPU compounds used in the cross-linkable TPU material of the invention have a $T_m$ (melting temperature as measured by DSC) greater than the Tc and less than 250° C.

According to embodiments, the cross-linkable SLS powder of the invention may contain one or more different TPU compounds. At least one of the TPU compounds in the SLS powder must meet the parameters described above making it suitable for use in the SLS method according to the invention.

According to embodiments, the cross-linkable SLS powder of the invention may comprise beside thermoplastic polyurethane one or more other polymers. Polymers that may be used in combination with the TPU described herein include polyolefins such as polyethylene (PE) and polypropylene (PP), styrenes such as polystyrene (PS), acrylonitrile butadiene styrene (ABS) and styrene acrylonitrile (SAN), polyamides, acrylic polymers such as polymethyl acrylate and polymethylmethacrylate, (chlorinated) polyvinylchloride, polyesters such as polyethylene terephthalate (PET) and terephthalate (PETG), polycarbonates (PC) or combinations thereof.

According to embodiments, the cross-linkable SLS powder of the invention is in the form of a powder having a $D_{97}$ particle diameter of less than 500 μm, preferably less than 300 μm, more preferably less than 220 μm.

According to embodiments, the cross-linkable SLS powder of the invention is in the form of a powder having a $D_{50}$ particle diameter of less than 250 μm, preferably less than 150 μm, more preferably less than 75 μm.

According to embodiments, the cross-linkable SLS powder of the invention is in the form of a powder having a $D_{10}$ particle diameter of more than 1 μm, preferably more than 10 μm, more preferably more than 20 μm.

According to embodiments, the cross-linkable SLS powder of the invention is in the form of a powder having particles with a sphericity factor of between 0.6 and 1, preferably between 0.85 and 1.

According to embodiments, the cross-linking reaction of the cross-linkable TPU compounds takes place after the process of depositing the cross-linkable powder and during the step of applying a cross-linking treatment selected from UV curing and/or heat treatment.

Production of Cross-Linkable TPU Compounds According to the Invention

The reactants for forming the cross-linkable TPU compounds suitable for use in the deposition process according to the invention are generally selected from:
- one or more polyfunctional isocyanates, preferably difunctional polyisocyanates, and
- one or more polyfunctional hydroxy compounds, preferably difunctional hydroxy compounds having an average molecular weight in the range 500-20000 g/mol, and
- one or more mono or difunctional hydroxy and/or amine compounds comprising radically polymerizable unsaturation(s) serving as chain extender or chain stopper, and
- optionally one or more chain extenders having an average molecular weight below 500 g/mol (typically a low molecular weight diol)
- optionally further additives
- in such amounts that the isocyanate index is generally between 80 and 110%, preferably between 96 and 102%. The polyfunctional, preferably difunctional isocyanates may comprise any aliphatic, cycloaliphatic or aromatic isocyanates.

The one or more polyfunctional isocyanates used for forming the cross-linkable thermoplastic polyurethane (TPU) compounds suitable for use in the deposition process according to the invention may consist essentially of pure 4,4'-diphenylmethane diisocyanate or mixtures of that diisocyanate with one or more other organic polyisocyanates, especially other diphenylmethane diisocyanates (MDI), for example the 2,4'-isomer optionally in conjunction with the 2,2'-isomer. The one or more polyfunctional isocyanates may also be an MDI variant derived from a polyisocyanate composition containing at least 95% by weight of 4,4'-diphenylmethane diisocyanate. Preferred polyfunctional isocyanates are those containing at least 90% by weight of 4,4'-diphenylmethane diisocyanate or its hydrogenated derivative. More preferably, the 4,4'-diphenylmethane diisocyanate content is at least 95% by weight, and most preferably at least 98% by weight.

According to embodiments, the one or more polyfunctional hydroxy compounds are selected from difunctional hydroxy compounds, preferably diols, used for forming the cross-linkable thermoplastic polyurethane (TPU) compounds suitable for use in the deposition process according to the invention generally have a molecular weight of between 500 g/mol and 20000 g/mol and may be selected from polyesteramides, polythioethers, polycarbonates, polyacetals, polyolefins, polysiloxanes and, especially, polyesters and polyethers or mixtures thereof.

Polyether diols used for forming the cross-linkable thermoplastic polyurethane (TPU) compounds suitable for use in the process according to the invention may include products obtained by the polymerization of a cyclic oxide, for example ethylene oxide, propylene oxide, butylene oxide or tetrahydrofuran in the presence, where necessary, of difunctional initiators. Suitable initiator compounds contain 2 active hydrogen atoms and include water, butanediol, ethylene glycol, propylene glycol, diethylene glycol, triethylene glycol, dipropylene glycol, 1,3-propane diol, neopentyl glycol, 1,4-butanediol, 1,5-pentanediol, 2-methyl-1,3-propanediol, 1,6-pentanediol and the like. Mixtures of initiators and/or cyclic oxides may be used.

Polyester diols used for forming the cross-linkable thermoplastic polyurethane (TPU) compounds suitable for use in the deposition process according to the invention may include hydroxyl-terminated reaction products of dihydric alcohols such as ethylene glycol, propylene glycol, diethylene glycol, 1,4-butanediol, neopentyl glycol, 2-methyl-1,3-propanediol, 1,6-hexanediol or cyclohexane dimethanol or mixtures of such dihydric alcohols, and dicarboxylic acids or their esterforming derivatives, for example succinic, glutaric and adipic acids or their dimethyl esters, sebacic acid, phthalic anhydride, tetrachlorophthalic anhydride or dimethyl terephthalate or mixtures thereof. Polycaprolactones and unsaturated polyesterpolyols should also be considered.

Suitable low molecular weight (generally below 400 g/mol) difunctional compounds that serve as chain extenders used for forming the cross-linkable thermoplastic polyurethane (TPU) compounds according to the invention may include diols, such as aliphatic diols like ethylene glycol, 1,3-propanediol, 2-methyl-1,3-propanediol, 1,4-butanediol, 1,5-pentanediol, 1,6-hexanediol, 1,8-octanediol, 1,9-nonanediol, 1,10-decanediol, 1,12-dodecanediol, 1,2-propanediol, 1,3-butanediol, 2,3-butanediol, 1,3-pentanediol, 2-ethyl-butanediol, 1,2-hexanediol, 1,2-octanediol, 1,2-decanediol, 3-methylpentane-1,5-diol, 2-methyl-2,4-pentanediol, 3-methyl-1,5-pentanediol, 2,5-dimethyl-2,5-hexanediol, 3-chloro-propanediol, 1,4-cyclohexanediol, 2-ethyl-2-butyl-1,3-propanediol, diethylene glycol, dipropylene glycol and tripropylene glycol, 1,4'-butyl enediol, 3-hydroxy-2,2-dimethyl-propanoic acid, aminoalcohols such as ethanolamine, N-methyldiethanolamine and the like, diamines, hydrazines and hydrazides and mixtures thereof. Preferred are diols such as hexanediol, 1,4-butanediol or ethylene glycol. 1,4-Butanediol is most preferred. Di-esters of terephthalic acid with glycols having 2 to 4 carbon atoms, e.g. terephthalic acid bis(ethylene glycol) or bis-1,4-butanediol, and hydroxyalkylene ethers of hydroquinone, and polyoxytetramethylene glycols having molecular weights of from 162 to 378 g/mol, are also suitable. Preferably the reaction mixture does not contain any low molecular weight triol.

The amount of chain extender used for forming the cross-linkable thermoplastic polyurethane (TPU) compounds according to the invention may be such that the molecular weight (MW) of the final cross-linkable thermoplastic polyurethane (TPU) can be controlled and be comprised between 5000 and 500000 g/mol. The amount of incorporated chain extender compounds is typically from 0.002 mmol/g of cross-linkable mixture to 4 mmol/g of cross-linkable mixture, preferably from 0.004 mmol/g of cross-linkable mixture to 2 mmol/g of cross-linkable mixture.

The invention also allows further controlling the hard block content of the at least one cross-linkable thermoplastic polyurethane (TPU) compound; especially one can control the processing and final use temperature to be used for printing 3D objects using laser sintering. The hardness of the final 3D object can be varied by changing the amount of hard block level in the thermoplastic polyurethane compounds. Typically, the hard block level is varied between 7 and 60 wt %; preferred values are from 10 wt % to 50 wt %. Generally, the number of urethane groups per kg of acrylate resin is between 0.5 and 2.5 and preferably between 0.5 and 1.5.

Co-Cross-Linkable Ethylenically Unsaturated Compounds According to the Invention According to embodiments, co-cross-linkable ethylenically unsaturated compounds may be present in the SLS powder of the invention, said co-cross-linkable ethylenically unsaturated compounds serve as a reactive diluent and lie dormant in said SLS powder during initial processing and polymerize if subjected to appropriate polymerization conditions. The co-cross-linker contains at least one polymerizable unsaturated group, preferably a radically polymerizable group. Examples of such ethylenically unsaturated compounds are dipentaerythritol penta acrylate, trimethylolpropane tri methacrylate, ditrimethylolpropane tri acrylate, pentaerythritol tetra acrylate, trimethylolpropane tri acrylate, butanediol di methacrylate, ethoxylated pentaerythritol tetra acrylate, hexanediol dimethacrylate, hexanediol diacrylate, lauryl methacrylate, 2-phenoxyethyl methacrylate, 2-phenoxyethyl acrylate, polyethyleneglycol di acrylate, polypropyleneglycol di acrylate, polycaprolactone di acrylate. Most preferred are acrylates and methacrylates or combinations thereof with a functionality ≥1.

In case the cross-linkable SLS powder of the invention comprises one or more ethylenically unsaturated compounds (referred to as reactive diluents or co-cross linkers), generally the amount of cross-linkable TPU compounds in the SLS powder is at least 50 wt %, preferably in the range 99 wt % and 50 wt %, preferably between 99 wt % and 70 wt % calculated on the total weight of the SLS powder and the amount of ethylenically unsaturated compounds in the SLS powder is <50 wt %, preferably in the range 1-30 wt %, more preferably in the range 1-20 wt % calculated on the total weight of the TPU powder. Preferably amount of cross-linkable TPU compounds in the SLS powder is >70 wt %, more preferably >80 wt % of cross-linkable TPU compounds calculated on the total weight of the SLS powder.

A preferred example of a reactive diluent is commercially available product Sartomer® SR368 which is solid at room temperature.

According to embodiments, the one or more ethylenically unsaturated compounds serving as co-cross linker have a number average molecular weight of 50-4000 g/mol, preferably 70-2000 g/mol, more preferably 70-1500 g/mol, preferably 70-1000 g/mol.

According to embodiments, the amount of ethylenically unsaturated compounds is <50 wt %, preferably in the range 1-30 wt %, more preferably in the range 1-20 wt % calculated on the total weight of the TPU material.

The ratio of TPU compounds and co-cross-linker, the hard block content of the TPU compounds, the molecular weight of the TPU compounds and the type of chain extender and/or chain stopper used for forming the cross-linkable thermoplastic polyurethane (TPU) SLS powder according to the invention may be chosen in such a way that the final melt volume rate of the cross-linkable thermoplastic polyurethane (TPU) SLS powder at a temperature T (measured at elevated temperature above Tm can be found within the range of 5 to 15 cm$^3$/10 min and this value does not increase by more than 90 cm$^3$/10 min when the temperature is increased by 20° C.

Preferably, the cross-linkable TPU material (and cross-linkable SLS powder) of the invention is solid at room temperature (temperature of about 20° C.). Addition of co-cross-linkable ethylenically unsaturated compounds into the TPU material has to be such that the cross-linkable TPU material and resulting cross-linkable SLS powder remains solid at room temperature.

Other conventional ingredients (additives and/or auxiliaries) may be used in making the at least one cross-linkable thermoplastic polyurethane (TPU) material that is used in the invention. These include catalysts, surfactants, flame proofing agents, fillers, pigments (to provide different colors), stabilizers and the like. Catalysts which enhance the formation of urethane and urea bonds may be used, for example, tin compounds, such as a tin salt of a carboxylic acid, e.g. dibutyltin dilaurate, stannous acetate and stannous octoate; amines, e.g. dimethylcyclohexylamine and triethylene diamine.

Production of the SLS Powder According to the Invention

The above-mentioned cross-linkable TPU materials comprising cross linkable TPU compounds are usually in pellet form after they have been produced and are processed further together with further additives and/or fillers to produce the cross-linkable SLS powder according to the invention.

According to embodiments flow additives (also referred to as fluidizers) are added in order to improve the powder flow and/or for improving film formation during the sintering process and are added in an amount of from 0.02 to 5% by weight, preferably from 0.1 to 3% by weight and more preferably from 0.2 to 2.5% by weight calculated on the total weight of the cross-linkable SLS powder. Flow additives may be selected from powdered inorganic substances having an average particle diameter of less than 25 μm. The optimal particle diameter of the flow agent probably is dependent on particle diameter of powder. The average range of the particle diameter of the flow additive particles should be in line with the diameter of the powder. Preferred flow additives may be selected from hydrated silicon dioxides, hydrophobicized pyrogenic silicas, amorphous aluminum oxide, vitreous silicon dioxides, vitreous phosphates, vitreous borates, vitreous oxides, titanium dioxide, talc, mica, pyrogenic silicon dioxides, kaolin, attapulgite, calcium silicates, calcium stearates, aluminum oxide, magnesium silicates and combinations thereof. A preferred example is the use of 0,2% by weight of $Al_2O_3$ powders or a combination of 1.5% by weight of Ca-Stearate with 0.2% by weight of fumed silica.

According to embodiments, thermal cross-linking initiators may be added, said compounds suitable as thermal cross-linking initiators are organic peroxides such as dicumylperoxide, 2,5-dimethyl-2,5-di(tert.-butyl)peroxide, 2,5-Bis(tert.-butylperoxide)-2,5-dimethyl-3-hexyne, di-tert.-butylperoxide, 2,5-Bis(tert.-butylperoxide)-2,5-dimethylhexane, Bis(tert.-butylperoxyisopropyl)benzene, m-octadexylazoformate and tert.-butyl peroxycumene, tert.-butyl peroxy 2-ethylhexylcarbonate. A preferred cross-linker is tert.-butyl peroxy 2-ethylhexylcarbonate.

According to embodiments, UV initiators may be added. Typical UV initiators comprise ketones such as 1-hydroxy-cyclohexylphenylketone, 2,2-dimethoxy-1,2-diphenylethan-1-one, 1-[4-(2-hydroxyethoxy)-phenyl]-2-methyl-1-propanone (HHPMP), and (bis)acylphosphineoxides such as bis(2,4,6-trimethylbenzoyl)-phenyl-phosphoneoxide (BTPPO).

According to embodiments, further additives may be added to produce the cross-linkable SLS powder according to the invention. Preferred additives may be selected from colour additives (pigments and/or dyes), anti-oxidants, flame retardants, stabilizers, anti-statics, conductive agents, heat stabilizers, inorganic and/or organic fillers (reinforcing materials), plasticizers and combinations thereof.

The pulverization process of the TPU pellets can be carried out together with the additives preferably mechanically at very low temperature (cryogenic comminution). Preferably the TPU pellets are deep-frozen by use of liquid nitrogen or liquid air and grinded in pin mills. The desired particle size is set by means of a sieving machine arranged downstream of the mill.

The invention claimed is:

1. A selective laser sintering (SLS) powder having a number average particle diameter size below <250 µm for use in additive manufacturing, said powder comprising at least 50 wt % of a cross-linkable TPU material calculated on the total weight of the powder and said cross-linkable TPU material having at least 50 wt % cross-linkable TPU compounds having a number average molecular weight in the range 5000 g/mol to 300000 g/mol and said TPU compounds having radically polymerizable unsaturation(s) incorporated in the TPU compounds which are UV and/or heat induced polymerizable moieties that give rise to chain growth polymerisation of the thermoplastic TPU compounds and wherein said cross-linkable TPU compounds are obtained by mixing and reacting at least the following ingredients:
one or more polyfunctional isocyanates,
one or more polyfunctional polyols having a number average molecular weight in the range 500-20000 g/mol, and
one or more mono or difunctional hydroxy and/or amine compounds comprising radically polymerizable unsaturation(s) serving as chain extender or chain stopper, and
one or more ethylenically unsaturated compounds.

2. The SLS powder according to claim 1, wherein the SLS powder further comprises a UV initiator and/or a thermal initiator.

3. The SLS powder according to claim 1, wherein the SLS powder has a Melt Volume Rate (MVR) at a given temperature above the melting temperature ($T_m$) of the SLS powder in accordance with ISO 1133 (at 5 minutes preheated time and load mass of 2.16 kg) from 5 to 15 cm³/10 min and a change in MVR when increasing the temperature by 20° C. of less than 90 cm³/10 min.

4. The SLS powder according to claim 1, wherein the cross-linkable TPU material is selected from cross-linkable thermoplastic polyurethane (TPU) material comprising at least 50 wt % of cross-linkable TPU compounds having polymerizable unsaturated groups selected from the group of ethylenes, (poly)alkyl olefins, dienes, styrenes, halogenated olefins, vinyl ethers, vinyl esters, (meth)acrylic esters, (meth)acrylonitriles, N-vinyl carbazoles, N-vinyl pyrrolidones, aldehydes and ketones and combinations thereof.

5. The SLS powder according to claim 1, wherein the polymerizable unsaturated groups are selected from (poly)alkylene glycol mono (meth)acrylates, (poly)alkylene glycol mono acrylates, and combinations thereof.

6. The SLS powder according to claim 1, wherein the cross-linkable TPU compounds have polymerizable unsaturated groups which are polymerizable through radical curing, anionic curing and/or cationic curing.

7. The SLS powder according to claim 1, wherein the cross-linkable TPU compounds have polymerizable unsaturated groups which are situated in the back bone and/or at the end of the cross-linkable TPU chain.

8. The SLS powder according to claim 1, wherein the cross-linkable TPU material is selected from a cross-linkable TPU material comprising cross-linkable TPU compounds having a number average molecular weight in the range 5000 g/mol and 100000 g/mol.

9. The SLS powder according to claim 1, wherein the cross-linkable TPU material is selected from a cross-linkable TPU material comprising cross-linkable TPU compounds having unsaturated groups in the back bone and/or at the end of the TPU chains and the one or more ethylenically unsaturated compounds are selected from acrylates, methacrylates, and combinations thereof.

10. The cross linkable SLS powder according claim 1, wherein the cross-linkable TPU compounds are obtained by further adding to the ingredients
one or more diol chain extenders, and/or one or more of a UV initiator and/or a thermal initiator.

11. The SLS powder according to claim 1, wherein the one or more ethylenically unsaturated compounds has a number average molecular weight of 50-4000 g/mol.

12. The SLS powder according to claim 1, wherein the amount of ethylenically unsaturated compounds is <50 wt %, calculated on the total weight of the TPU material.

13. The SLS powder according to claim 1, wherein the cross-linkable TPU compounds are selected from cross-linkable thermoplastic polyurethane (TPU) compounds having a crystallization temperature (Tc) measured by DSC in accordance with ISO 11357 (taking only the first heating run into account and using a cooling rate of 10 K/min) of at least 40° C.

14. The SLS powder according to claim 1, wherein the cross-linkable TPU compounds are selected from cross-linkable TPU compounds wherein the difference between the $T_m$ and $T_c$ of the cross-linkable thermoplastic polyurethanes (TPU) measured by DSC is between 10° C. and 75° C.

15. The SLS powder according to claim 1, wherein the cross-linkable TPU compounds are selected from cross-linkable TPU compounds having a $T_m$ measured by DSC in accordance with ISO 11357 (taking only the first heating run into account and using a heating rate of 10 K/min) of at least 50° C.

16. The SLS powder according to claim 1, wherein the cross-linkable SLS powder has an average particle size below <250 µm and a sphericity factor of between 0.6 and 1.

17. The SLS powder according to claim 1, wherein the cross-linkable SLS powder has a $D_{50}$ particle diameter <250 µm, a $D_{97}$ particle diameter <500 µm, a $D_{10}$ particle diameter ≥1 µm, and a sphericity factor of between 0.6 and 1.

18. A selective laser sintering (SLS) process to form a 3D object using the cross-linkable SLS powder according to claim 1, which makes it possible to create interlayer covalent bondings between deposited layers of cross-linkable SLS powder, said process having at least the following steps:
a) providing onto a surface a first layer of a cross-linkable SLS powder according to claim 1;
b) defining a predefined pattern with an infrared (IR) laser sintering into said first layer by inducing a temperature above the $T_m$ such that particles of the cross-linkable SLS powder are sintered to form a predefined pattern of the 3D object (sintering step), and then or simultaneously
c) applying a cross-linking treatment selected from electron beam treatment, UV treatment and/or heat treatment in order to convert at least part of the sintered cross-linkable TPU material into thermoset cross-linked PU material thereby remaining at least partly polymerizable moieties on top of the deposited SLS powder layer (curing step), d) providing a second layer of cross-linkable SLS powder on top of the first layer,
e) applying a second sintering step (b) and curing step (c) to further define the predefined 3D object,
f) repeating steps (a)-(e) until the 3D object is finalized, and then optionally
g) applying a final cross-linking treatment selected from UV curing and/or heat treatment in order to convert at least some of the remaining cross-linkable TPU material(s) into thermoset TPU material(s).

19. The process according to claim 18, wherein step (b) of defining a predefined pattern with laser sintering is performed at a temperature above the $T_m+2°$ C.

20. The process according to claim 18, wherein step (c) of applying a cross-linking treatment is achieved by tuning the intensity of the curing agent by tuning the strength of a UV radiation laser and/or by providing a cure regulating environment.

21. The process according to claim 20, wherein the cure regulating environment is created by providing an oxygen rich environment on top of the deposited SLS powder layer wherein the amount of oxygen is above 30 ppm calculated on the total amount of gasses in the environment above the deposited SLS powder layer.

22. The process according to claim 18, wherein the 3D printed object is made using a cross-linkable SLS powder which comprises different cross-linkable TPU materials having different mechanical properties, thermo stability properties, and/or colours before and/or after performing the curing step (c).

23. The process according to claim 18, wherein the 3D printed object is made using at least a first and a second cross-linkable SLS powder wherein the first cross-linkable SLS powder has different cross-linkable TPU materials having different mechanical properties, thermo stability properties, and/or colours compared to the second cross-linkable SLS powder before and/or after performing the curing step (c).

24. A three dimensional (3D) printed object using the process according to claim 18.

* * * * *